US007079945B1

(12) United States Patent
Kaplan

(10) Patent No.: US 7,079,945 B1
(45) Date of Patent: Jul. 18, 2006

(54) GEOGRAPHIC DATABASE INCLUDING DATA INDICATING WIRELESS COVERAGE AND METHOD AND SYSTEM FOR USE THEREOF

(75) Inventor: Lawrence M. Kaplan, Northbrook, IL (US)

(73) Assignee: Navteq North America, LLC, Chicago, IL (US)

( * ) Notice: Subject to any disclaimer, the term of this patent is extended or adjusted under 35 U.S.C. 154(b) by 0 days.

(21) Appl. No.: 09/836,501

(22) Filed: Apr. 17, 2001

(51) Int. Cl.
*G01C 21/30* (2006.01)

(52) U.S. Cl. .................. 701/208; 701/207; 701/210; 340/988; 340/990; 342/357.01

(58) Field of Classification Search ................ 701/207, 701/208, 209, 210; 340/990, 995, 988; 370/252, 370/332; 455/456; 342/357.01, 357.11, 342/357.13
See application file for complete search history.

(56) References Cited

U.S. PATENT DOCUMENTS

| | | | | |
|---|---|---|---|---|
| 5,948,042 | A * | 9/1999 | Heimann et al. ........... | 701/117 |
| 6,138,072 | A * | 10/2000 | Nagai ........................ | 340/988 |
| 6,169,956 | B1 | 1/2001 | Morimoto et al. ......... | 701/209 |
| 6,292,743 | B1 * | 9/2001 | Pu et al. .................... | 455/456 |
| 6,292,745 | B1 * | 9/2001 | Robare et al. .............. | 701/208 |
| 6,317,685 | B1 * | 11/2001 | Kozak et al. ............... | 701/210 |
| 6,338,020 | B1 * | 1/2002 | Hashimoto ................. | 701/208 |
| 6,374,177 | B1 * | 4/2002 | Lee et al. ................... | 340/988 |
| 6,400,690 | B1 * | 6/2002 | Liu et al. .................... | 340/995 |
| 6,484,092 | B1 * | 11/2002 | Seibel ......................... | 701/209 |
| 2002/0029108 | A1 | 3/2002 | Liu et al. .................... | 701/208 |

* cited by examiner

*Primary Examiner*—Gertrude A. Jeanglaude
(74) *Attorney, Agent, or Firm*—Frank J. Kozak; Jon D. Shutter; Grace L. O'Brien

(57) ABSTRACT

Wireless coverage data are associated with a geographic database that contains data that represent a road network in a geographic region. The wireless coverage data indicate areas within the geographic region in which navigation-related services or data from a navigation services provider are available wirelessly, or conversely, areas within the geographic region in which navigation-related services or data from a navigation services provider are not available wirelessly. An end user obtains the wireless coverage data. The wireless coverage data are used to indicate to the end user areas in which navigation-related services or data from the navigation services provider are available wirelessly or areas in which navigation-related services or data from the navigation services provider are not available wirelessly. The wireless coverage data may also be used to warn the end user when he/she is leaving an area in which navigation-related services or data from the navigation services provider are available wirelessly. Data for uncovered areas can be downloaded to an end user's computing platform while the end user is still within an area in which navigation-related data from the navigation services provider are available wirelessly.

39 Claims, 10 Drawing Sheets

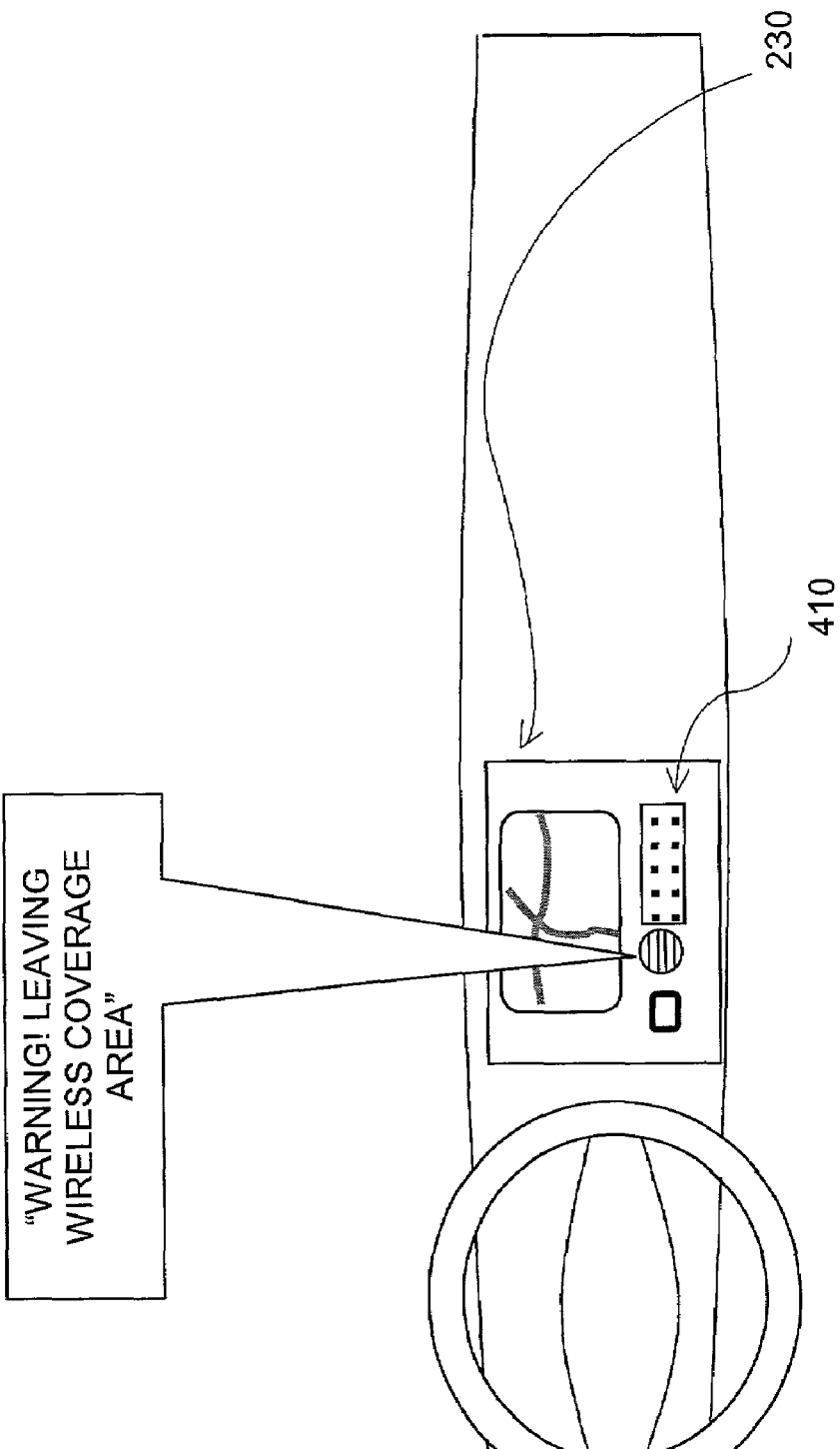

GEOGRAPHIC DATABASE INCLUDING DATA INDICATING WIRELESS COVERAGE AND METHOD AND SYSTEM FOR USE THEREOF

BACKGROUND OF THE INVENTION

The present invention relates to geographic data and systems that use geographic data, and more particularly, the present invention relates to a feature provided by a system, such as a navigation system, whereby a user of the system is provided with information that indicates areas in which navigation-related data are available wirelessly.

There are various computer architectures for navigation systems that provide navigation-related features (including map-related features). In one type of architecture for a navigation system, end users (such as vehicle drivers, passengers, and others) use a wireless communications system to obtain navigation-related services or data from a remotely located navigation services provider. The end users use various computer platforms (e.g., different kinds of electronic devices and/or systems) to connect to the wireless communications system to access the remotely located navigation service provider. Associated with the remotely located navigation services provider is a geographic database. When an end user uses his/her computer platform to request a navigation-related service or data, the remotely located navigation service provider accesses the geographic database associated therewith and then provides the requested service or data to the requesting end user's computer platform via the wireless communications system.

This type of navigation system architecture provides several advantages. One advantage relates to providing updated data. There is a continuing need to update the data used by a navigation system. For example, new streets are built, road construction closes roads, detours are established, new businesses open, posted speed limits change, new turn restrictions are established at intersections, streets are renamed, and so on. These kinds of changes can affect travel through a geographic region. Accordingly, the data used by a navigation system should be updated on a regular basis to accurately reflect changes in the represented geographic features. A computer architecture in which end user computing platforms obtain data from a single central geographic database associated with a navigation services provider affords an advantage with respect to the updating of the geographic data. With a computer architecture in which end user computing platforms obtain data wirelessly from a single central geographic database associated with a navigation services provider, updates need to be applied only to the central database.

Although there are advantages associated with a navigation system architecture in which individual end user computer platforms request and obtain navigation-related services and data wirelessly from a single central geographic database associated with a navigation services provider, there are considerations that need to be addressed. One consideration relates to the coverage area(s) in which end users can obtain navigation-related services and data wirelessly. According to one type of navigation system architecture, a navigation services provider provides navigation-related services and data with respect to a coverage area. A wireless communications system, associated with the navigation services provider, is available throughout the coverage area. End users located throughout the coverage area use the wireless communications system to access the navigation services provider to obtain navigation-related services and data. The coverage area served by the wireless communications system and navigation services provider may correspond to a metropolitan region. Alternatively, the coverage area associated with a navigation services provider may correspond to a state or region of the country. Thus, within an entire country, such as the United States, there may be a number of different coverage areas that are served by one or more navigation services providers. According to this type of navigation system architecture, navigation-related services and data are not available wirelessly outside the coverage areas. The unavailability of navigation-related services or data outside of coverage areas may be inconvenient to some end users. Accordingly, it would be preferable to reduce or minimize any inconvenience to end users of this navigation system architecture occasioned by the lack of navigation-related services or data outside the coverage areas served by wireless communications systems associated with navigation services providers.

SUMMARY OF THE INVENTION

To address these and other objectives, the present invention comprises wireless coverage data associated with a geographic database that contains data that represent a road network in a geographic region. The wireless coverage data indicate one or more areas within the geographic region in which navigation-related services or data from a navigation services provider are available wirelessly, or conversely, areas within the geographic region in which navigation-related services or data from a navigation services provider are not available wirelessly. An end user obtains the wireless coverage data. The wireless coverage data are used to indicate to the end user areas in which navigation-related services or data from a navigation services provider are available wirelessly or areas in which navigation-related services or data from a navigation services provider are not available wirelessly. The wireless coverage data may also be used to warn the end user when he/she is leaving an area in which navigation-related services or data from a navigation services provider are available wirelessly. Data for uncovered areas can be downloaded to an end user's computing platform while the end user is still within an area in which navigation-related data and services from a navigation services provider are available wirelessly.

BRIEF DESCRIPTION OF THE DRAWINGS

FIG. 11 is an illustration of the end user's computing platform of FIG. 8 including an audible warning message about the availability of wireless coverage.

DETAILED DESCRIPTION OF THE PRESENTLY PREFERRED EMBODIMENTS

I. Wireless Coverage Data in Geographic Database

A. Navigation System with Wireless Coverage Areas

Figure 1:
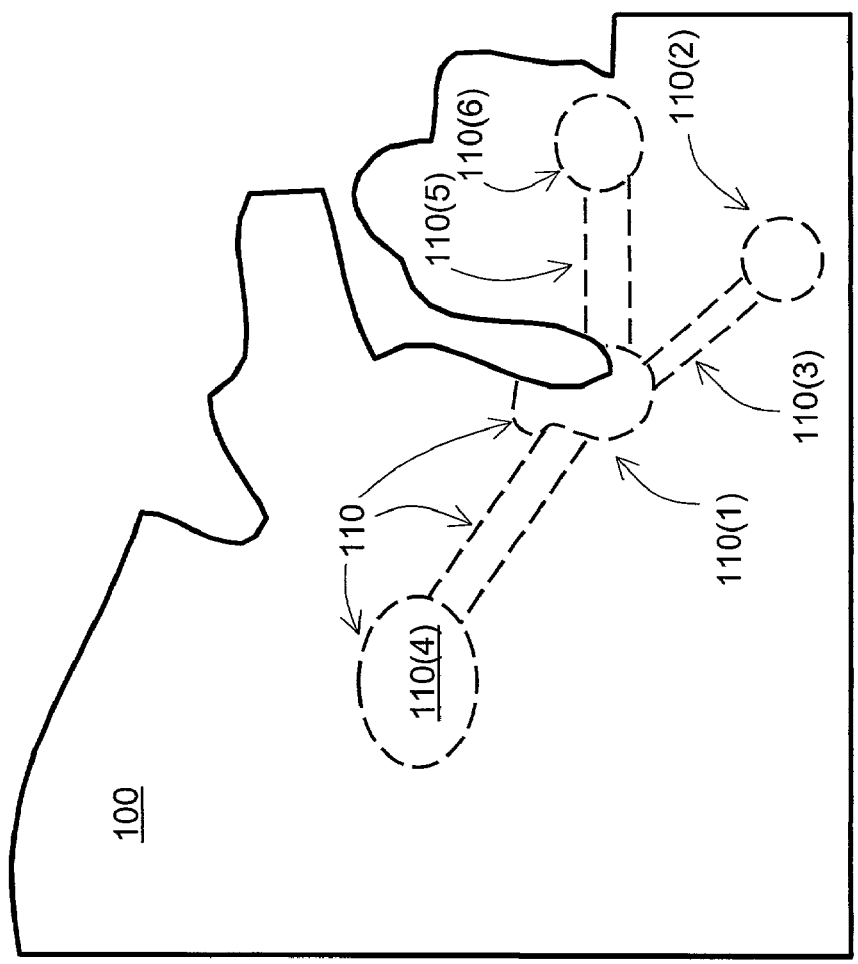
FIG. 1 is a map showing a geographic region.

FIG. 1 is a map showing a geographic region 100. In FIG. 1, the geographic region 100 includes a portion of the Midwest United States. The portion shown in FIG. 1 is exemplary and the present embodiment can be applied in any geographic region in the United States or in any other country.

In the map of the geographic region 100 in FIG. 1, several wireless coverage areas 110 are shown. These wireless coverage areas 110 are labeled, 110(1), 110(2), 110(3) . . . etc. In the geographic region 100 shown in FIG. 1, some of these coverage areas 110 correspond to metropolitan areas, or combinations of metropolitan areas. For example, the wireless coverage area 110(1) corresponds to the Chicago and Milwaukee metropolitan areas and the wireless coverage area 110(2) corresponds to the Indianapolis metropolitan area. In addition, some of the coverage areas 10 in FIG. 1 correspond to connecting travel corridors. For example, the wireless coverage area 110(3) corresponds to a connecting travel corridor located between Chicago and Indianapolis. (The wireless coverage area 110(3) is located along I-65.) The coverage areas 110 indicated in FIG. 1 indicate areas in which navigation data area available wirelessly from a navigation services provider.

Figure 2:
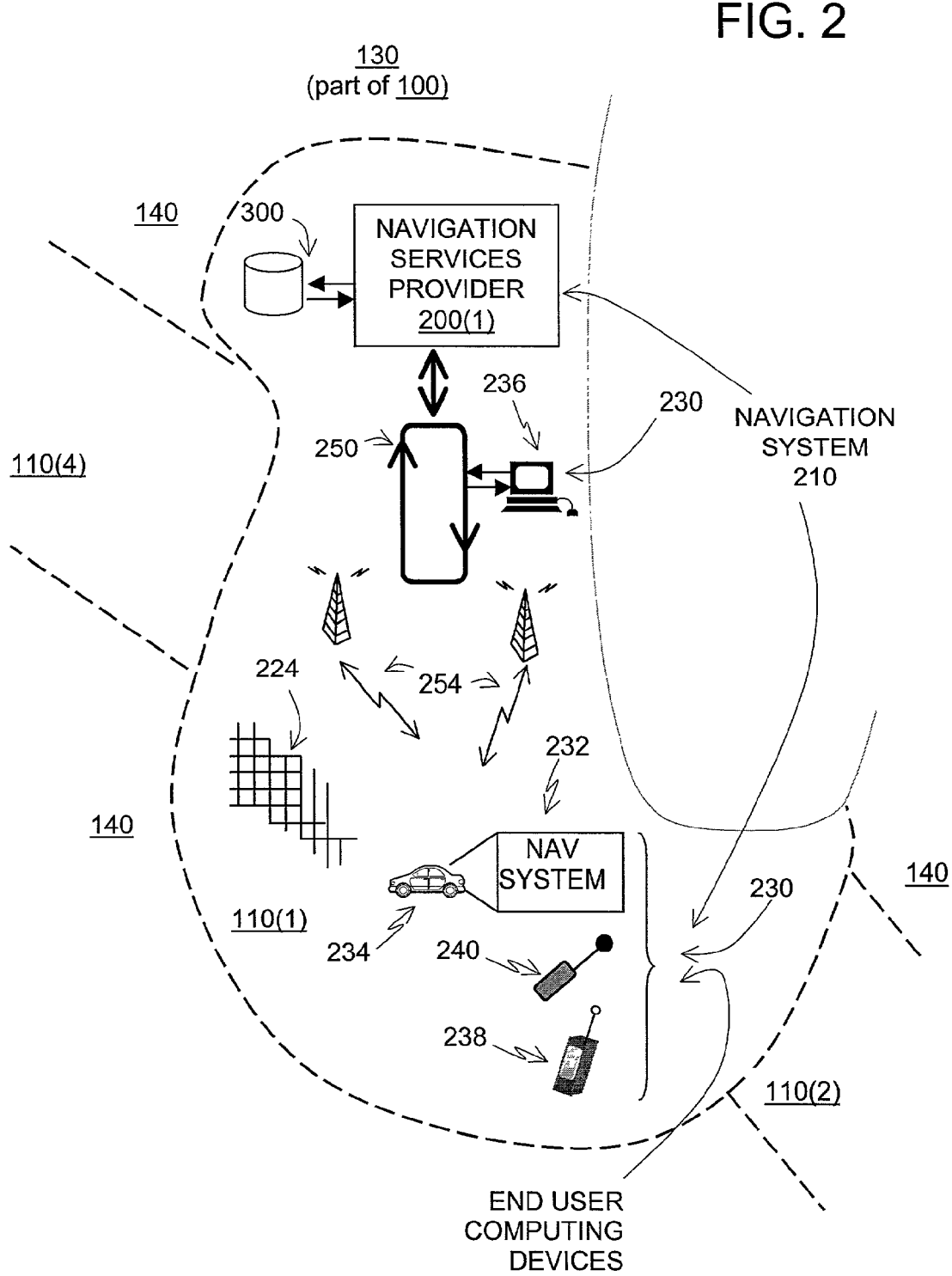
FIG. 2 a map showing a portion of the geographic region shown in FIG. 1.

FIG. 2 is a map showing a portion 130 of the geographic region 100 shown in FIG. 1. The portion 130 of the geographic region 100 shown in FIG. 2 includes the wireless coverage area 110(1) that corresponds to the Chicago and Milwaukee metropolitan areas. The portion 130 of the geographic region 100 shown in FIG. 2 also includes some areas 140 that are located outside the wireless coverage areas 110.

The wireless coverage area 110(1) is served by a navigation services provider 200(1). The navigation services provider 200(1) is part of a navigation services system 210. The navigation services system 210 serves end users (e.g., vehicle drivers and passengers, as well as other persons) in the wireless coverage area 110(1). The navigation services system 210 is used by the end users to obtain navigation-related services (including map-related services) and/or data wirelessly from the navigation services provider 200(1) while the end users are located in the wireless coverage area 110(1). The navigation-related services or data that the end users obtain from the navigation services provider 200 relate to the wireless coverage area 110(1) as well as areas outside the wireless coverage area 110(1). The navigation-related services include information about travel along roads 224 located in the wireless coverage area 110(1) as well as roads located in areas outside the wireless coverage area 110(1). The navigation-related services include route calculation and guidance, people and business finding services (e.g., electronic yellow and white pages), maps, point of interest searching, destination selection, and so on.

End users located in the coverage area 110(1) use various different computer platforms 230 to access the navigation services provider 200 to request and obtain navigation-related and map-related features and geographic data. These various computer platforms 230 (also referred to as "end user computing devices" or "client computing platforms") may include navigation system units 232 located in vehicles 234, personal computers 236, personal organizers (e.g., PDAs, PalmPilot®-type devices) 238, portable phones 240, or any other types of computing device.

The various end user computing platforms 230 access the navigation services provider 200 over a data communications network 250. The data communications network 250 may be part of, or connected to, the Internet. The data network 250 may use any suitable technology and/or protocols that are currently available, as well as technology and/or protocols that become available in the future. For example, the data network may use WAP, TCP/IP, etc. More than one protocol may be used in the data network 250 with appropriate conversions.

At least a portion of the data communications network 250 includes a wireless portion 254. The wireless portion 254 of the data communications network 250 enables two-way communication between the end user computing platforms 230 and the navigation services provider 200(1). The wireless portion 254 may be implemented by any suitable form of wireless communication, including cellular, PCS, satellite, FM, radio, or technologies that may be developed in the future. The wireless portion 254 may include one or more transmitters, such as a transponder tower, an antenna tower, an FM tower, satellites, or other suitable means. The transmitters include an appropriate communication link to the navigation services provider 200(1). This link may be land-based or may be wireless.

At least some of the end user computing devices 230 are mobile devices. These mobile end user computing devices 230 use the wireless portion 254 of the data communications network 250 to access the navigation services provider 200(1). These mobile end user computing devices 230 includes the appropriate hardware and software to access the navigation services provider 200 over the wireless communications network 254 of the data network 250. Some end user computing devices may not be mobile devices. For example, these non-mobile end user computing devices may include desktop personal computers 236. These non-mobile end user computing devices 230 may access the navigation services provider 200(1) over the data communications network 250 without using the wireless portion 254.

As mentioned above, the end users obtain navigation-related services or data wirelessly from the navigation services provider 200(1) while the end users are located in the wireless coverage area 110(1). So long as the end users remain in the coverage area 110(1), they are within the range of service coverage of the wireless communications system 254 and can obtain navigation-related services or data from the navigation services provider 200(1). However, if an end user travels outside the wireless coverage area 110(1), he/she becomes out of range of the service coverage of the wireless communications system 254 and as a result, is unable to obtain navigation-related services or data wirelessly from the navigation services provider 200(1).

In order to assist end users, a present embodiment includes a feature whereby end users are provided with information about the geographic range of availability of wireless navigation-related or data services. In one embodiment, end users are provided with wireless coverage data that indicate the geographic range of availability of wireless navigation-related or data. These wireless coverage data can be used by an application in the end user's computing device 230 to indicate to the end user where (geographically), navigation-related or data are available wirelessly. In addition, these wireless coverage data can also be used to indicate to the end user where (geographically), navigation-related or data are not available wirelessly. (This information about wireless coverage availability can be used on the end user's computing device in several different ways, as explained in more detail below.)

B. Wireless Coverage Data

According to one embodiment, the wireless coverage data are associated with (or included in) a geographic database 300. The geographic database 300 is used by the navigation services system 210. The geographic database 300 includes data representing the roads and intersections in the wireless coverage area 110(1). The data contained in the geographic database 300 includes information relating to the represented roads and intersections, such as turn restrictions at intersections, speed limits along the roads, street names of the various roads, address ranges along the roads, and so on. The geographic database 300 also contains information about points of interest and businesses located in the wireless coverage area 110(1). The geographic database 300 also contains other information about the wireless coverage area 110(1), such as information about government divisions (e.g., cities, states), government services (e.g., police stations, post offices, community centers), postal zones, area codes, etc. In this embodiment, the geographic database 300 also includes data about areas outside the wireless coverage area 110(1). However, in an alternative embodiment, the geographic database 300 does not necessarily include data about areas outside the wireless coverage area 110(1).

According to some embodiments, the wireless coverage data are included as data attributes of other geographic features that are represented by the geographic database 300.

(1) Wireless Coverage as an Attribute of Road Segment Data

In one embodiment, wireless coverage data are included as attributes of road segment data. The geographic database 300 in FIG. 2 includes data that represents roads. In the embodiment of the geographic database 300, there is at least one database entry (also referred to as "entity" or "record") for each road segment represented in a geographic region. A road segment refers to a portion of a road between two immediately adjacent intersections or between a dead end and the intersection immediately adjacent to the dead end. A road segment can also refer to a portion of a road along which all the attributes of the road are the same.

Figure 3:
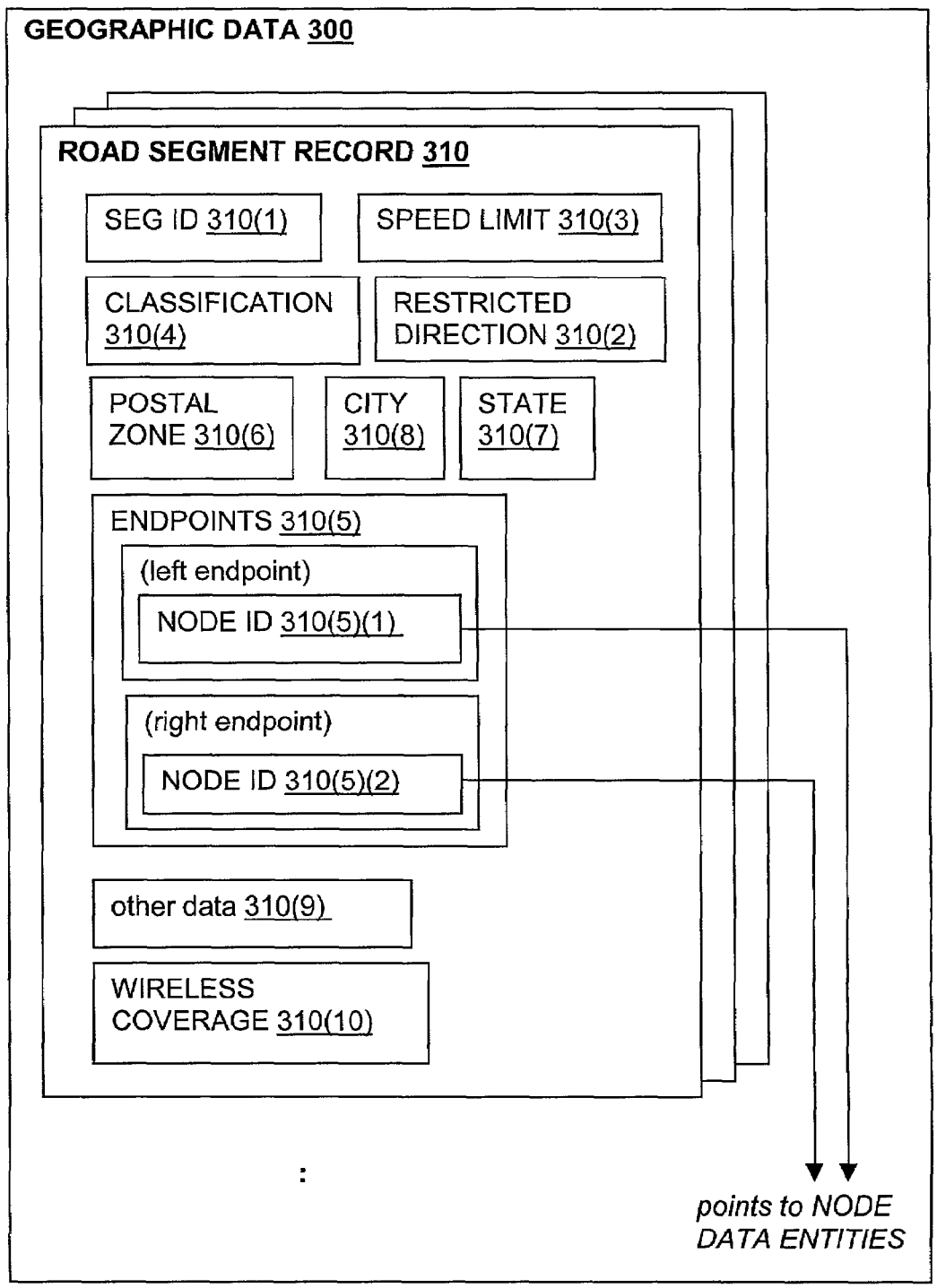
FIG. 3 is a block diagram that shows some of the components of a road segment data record contained in the geographic database of FIG. 2.

FIG. 3 shows some of the components of a data record 310 that represents a road segment. The road segment data record 310 is included in the geographic database 300. Each road segment data record 310 may have associated with it information (such as "attributes", "fields", etc.) that describe features of the represented road segment. The road segment record 310 includes a segment ID 310(1) by which the data record can be identified in the geographic database 300. The road segment data record 310 may also include data 310(2) that indicates the restrictions, if any, on the direction of vehicular travel permitted on the represented road segment. The road segment data record 310 includes data 310(3) that indicates a speed limit or speed category (i.e., the maximum permitted vehicular speed of travel on the represented road segment). The road segment data record 310 may also include data 310(4) indicating whether the represented road segment is part of a controlled access road (such as an expressway), a ramp to a controlled access road, a bridge, a tunnel, a toll road, a ferry, and so on.

The road segment data record 310 also includes data 310(5) providing the geographic coordinates (e.g., the latitude and longitude) of the endpoints of the represented road segment. In one embodiment, this data 310(5) are references to the node data records 312(1) and 312(2) that represent the endpoints of the represented road segment.

The road segment data record 310 also includes data 310(6) indicating the postal zone in which the road segment is located, data 310(7) indicating the state in which the road segment is located, and data 310(8) indicating the city in which the road segment is located.

The road segment record 310 may also include or be associated with other data 310(9) that refer to various other attributes of the represented road segment. For example, the road segment data record may include data identifying what turn restrictions exist at each of the nodes which correspond to intersections at the ends of the represented road segment, the name or names by which the represented road segment is known, the street address ranges along the represented road segment, and so on. The various attributes associated with a road segment may be included in a single road segment record, or preferably are included in more than one type of road segment record which are cross-referenced to each other.

In the embodiment shown in FIG. 3, the road segment record 310 includes a data attribute 310(10) relating to wireless coverage. The wireless coverage data attribute 310(10) indicates whether navigation-related services or data are available wirelessly from a remotely located navigation services provider when an end user is located on the road segment represented by the road segment record. The wireless coverage data attribute 310(10) may also identify the navigation services provider and the levels of service that are available (if different levels exist), as well as other data.

(2) Wireless Coverage as an Attribute of Node Data

Figure 4:
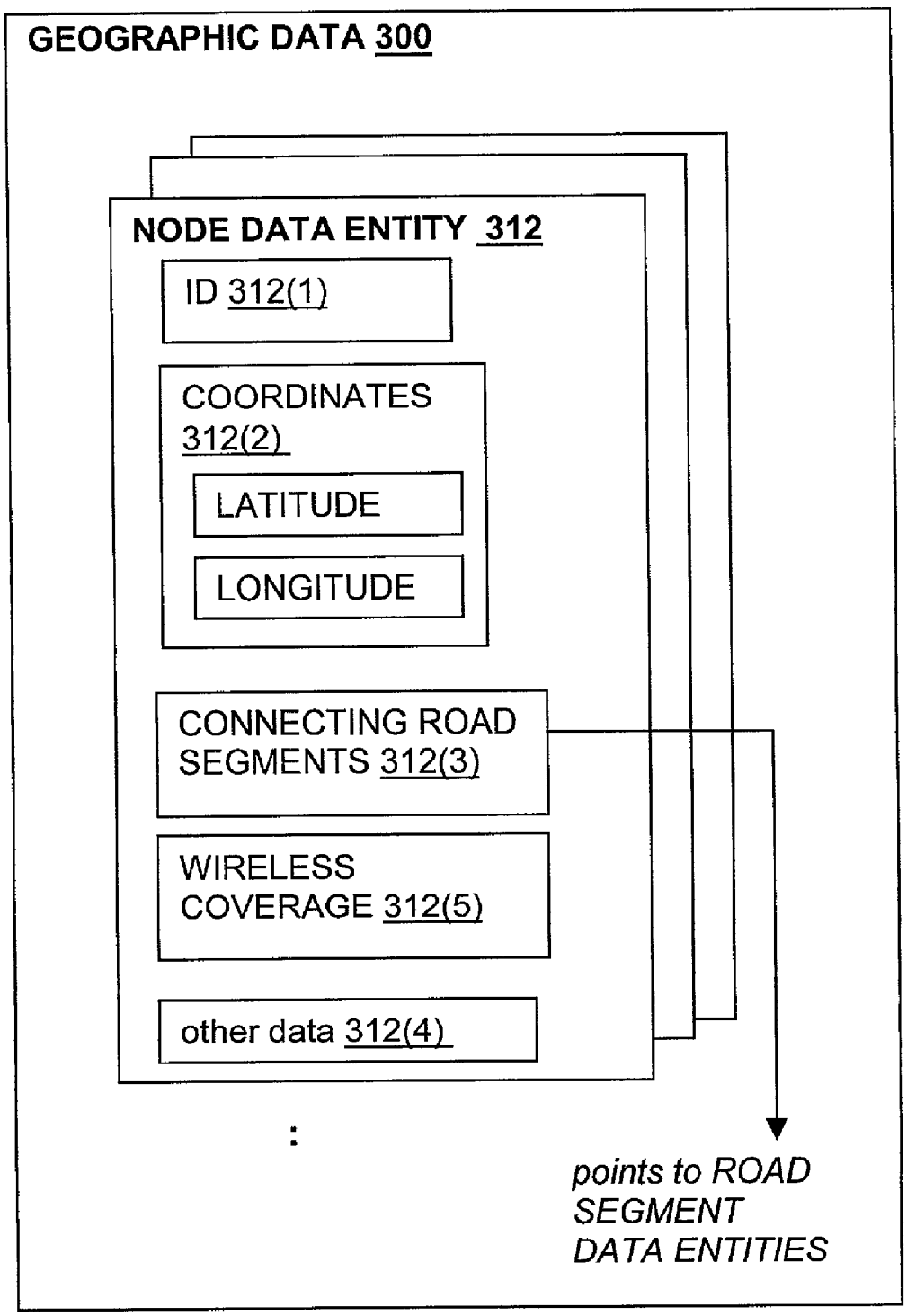
FIG. 4 is a block diagram that shows some of the components of a node data record contained in the geographic database of FIG. 2 according to an alternative embodiment.

In alternative embodiments, data that indicate the range of wireless coverage can be associated with data that represent types of geographic features other than road segments. As an example, according to a second embodiment, data that indicate the range of wireless coverage can be associated with data records that represent nodes. Nodes refer to the points at each end of a road segment. According to this embodiment, the geographic database 300 includes data records that represent nodes, i.e., node data records. Some of the components of a node data record 312 are shown in FIG. 4. Each node data record 312 may have associated information (such as "attributes", "fields", etc.) that describe features of the represented node. The node record 312 includes a node ID 312(1) by which the data record can be identified in the geographic database 300. The node record 312 also include data 312(2) that indicate the geographic position (e.g., its latitude and longitude coordinates) of the represented node. The node record 312 may also include data 312(3) that indicate the road segment(s) that connect to it. The node record 312 may also include or be associated with other data 312(4) that refer to various other attributes of the represented node.

In this embodiment, the node record 312 includes a data attribute 312(5) relating to wireless coverage. The wireless coverage data attribute 312(5) indicates whether navigation-related services or data are available wirelessly from a remotely located navigation services provider when an end user is located at the node represented by the node record. The wireless coverage data attribute 312(5) may also identify the navigation services provider and the levels of service that are available, as well as other data.

(3) Wireless Coverage as an Attribute of Postal Data

Figure 5:
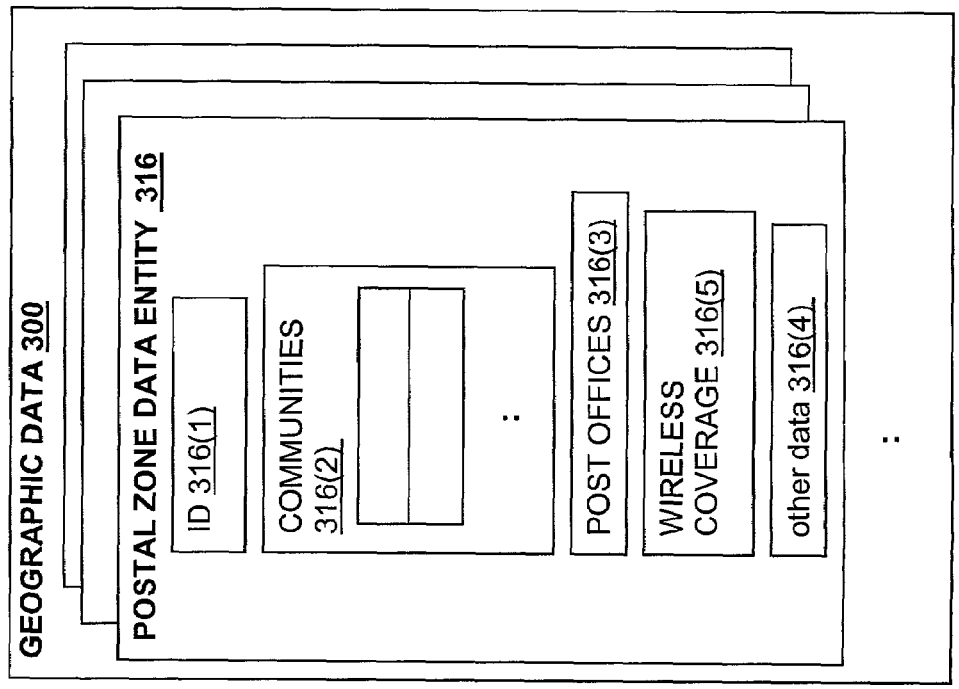
FIG. 5 is a block diagram that shows some of the components of a postal zone data record contained in the geographic database of FIG. 2 according to an alternative embodiment.

In another alternative embodiment, data that indicate the range of wireless coverage can be associated with data that represent postal zones. According to this embodiment, the geographic database 300 includes postal zone records. Some of the components of a postal zone record 316 are shown in FIG. 5. The postal zone record 316 includes an ID 316(1) by which the postal zone record can be identified in the geographic database 300. The postal zone record 316 may also include data 316(2) that indicate the communities located within the represented postal zone. The postal zone record 316 may also include data 316(3) that indicate the locations(s) of post offices within the represented postal zone. The postal zone record 316 may also include or be associated with other data 316(4) that refer to various other attributes of the represented postal zone.

In this embodiment, the postal zone record 316 includes a data attribute 316(5) relating to wireless coverage. The wireless coverage data attribute 316(5) indicates whether navigation-related services or data are available wirelessly from a remotely located navigation services provider when an end user is located in the postal zone represented by the postal zone record. The wireless coverage data attribute 316(5) may also include other types of information, as explained above.

(4) Wireless Coverage as an Attribute of Administrative Data

Figure 6:
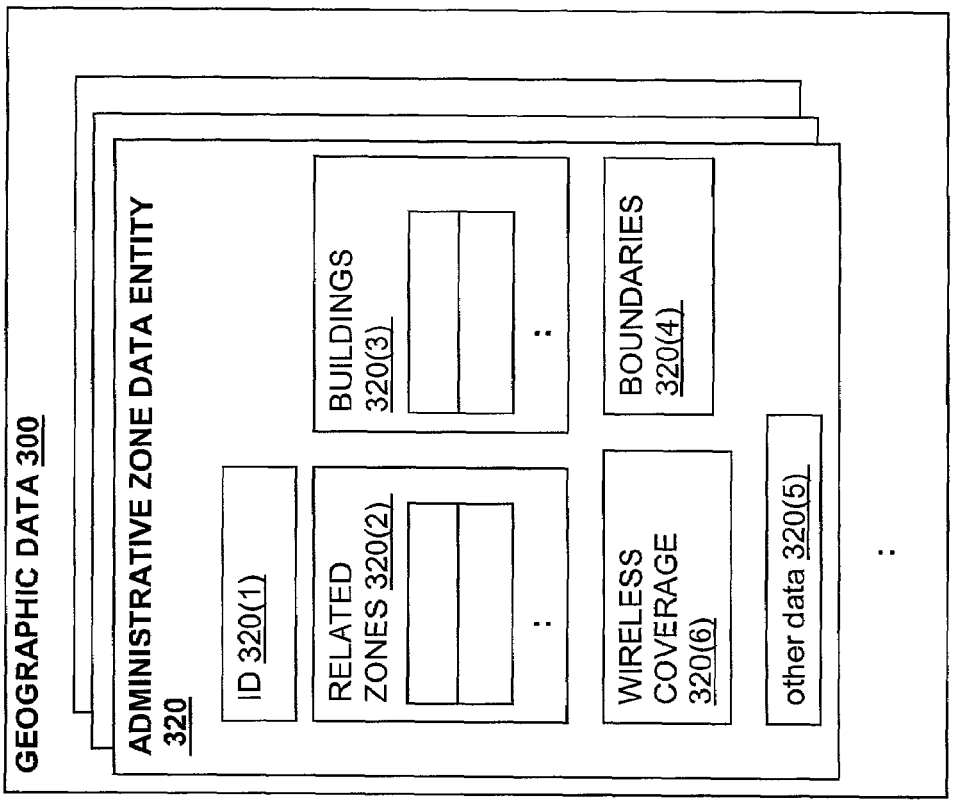
FIG. 6 is a block diagram that shows some of the components of an administrative area data record contained in the geographic database of FIG. 2 according to an alternative embodiment.

In a fourth embodiment, data that indicate the range of wireless coverage are associated with data records that represent administrative zones. Administrative zones include countries, states, cities (towns, villages, etc.), counties, townships, provinces, etc. According to this embodiment, the geographic database 300 includes administrative zone records. Some of the components of an administrative zone record 320 are shown in FIG. 6. The administrative zone record 320 includes an ID 320(1) by which the administrative zone record can be identified in the geographic database 300. The administrative zone record 320 also includes data 320(2) that indicate related administrative zones. The administrative zone record 320 may also include data 320(3) that indicate the locations(s) of administrative buildings (e.g., city halls, state capitols, court houses) within the represented administrative zone. The administrative zone data record 320 also includes data 320(4) that indicate the boundaries of the administrative zone. The administrative zone record 320 may also include or be associated with other data 320(5) that refer to various other attributes of the represented administrative zone.

In this embodiment, the administrative zone data record 320 also includes a data attribute 320(6) relating to wireless coverage. The wireless coverage data attribute 320(6) indicates whether navigation-related services or data are available wirelessly from a remotely located navigation services provider when an end user is located in the administrative zone represented by the administrative zone record. The wireless coverage data attribute 320(6) may also include other types of information, as explained above.

(5) Wireless Coverage Defined with an Arbitrary Boundary

Figure 7:
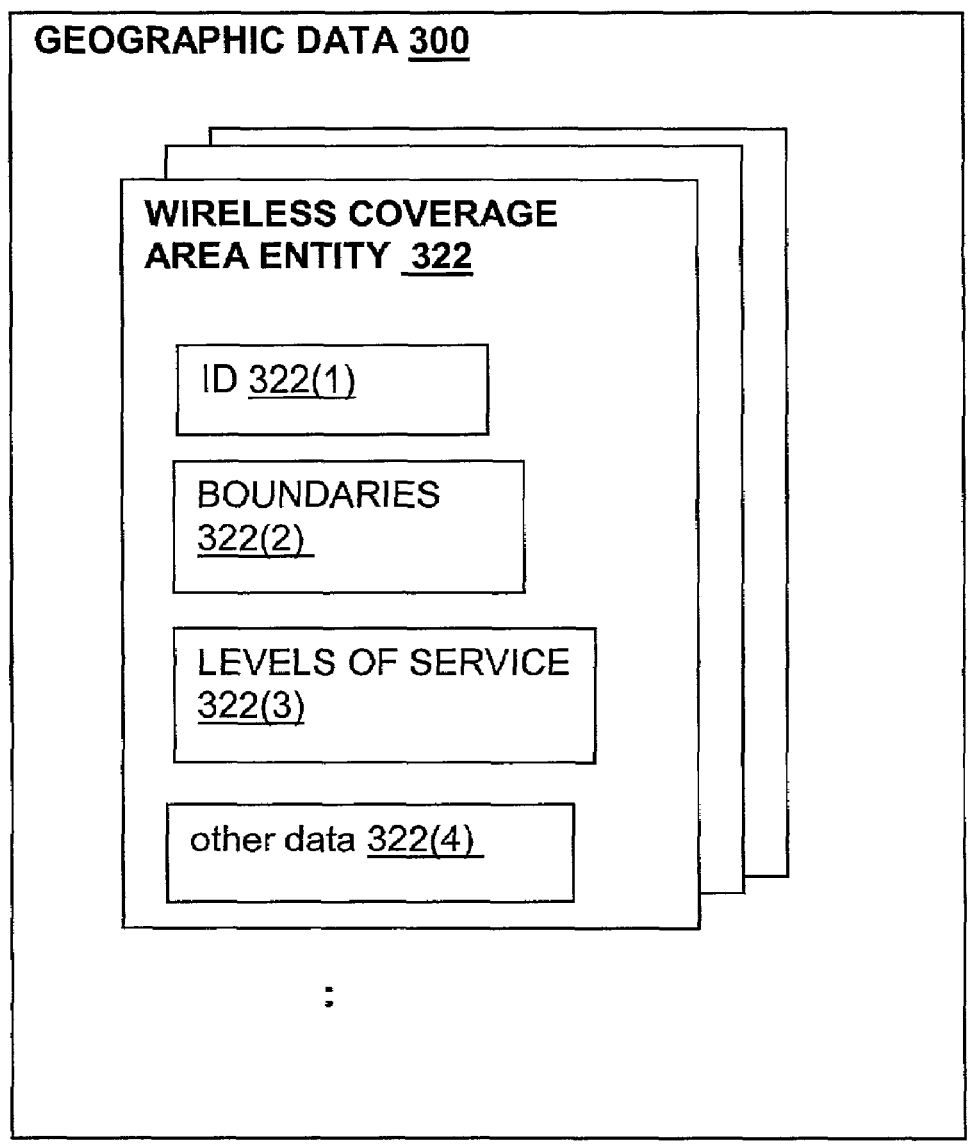
FIG. 7 is a block diagram that shows some of the components of a wireless coverage area data record contained in the geographic database of FIG. 2 according to an alternative embodiment.

In another alternative embodiment, data that indicate the range of wireless coverage can be defined with respect to an arbitrary boundary. According to this embodiment, the geographic database 300 includes wireless coverage area records. Some of the components of a wireless coverage area record 322 are shown in FIG. 7. The wireless coverage area record 322 includes an ID 322(1) by which the wireless coverage area record can be identified in the geographic database 300. The wireless coverage area record 322 also includes data 322(2) that indicate the boundaries of the represented wireless coverage area. The boundaries of the wireless coverage area can be defined in any way. The wireless coverage data attribute 322(3) may also identify the navigation services provider and the levels of service that are available, as well as other data, as explained above. The wireless coverage area record 322 may also include or be associated with other data 322(4) that refer to various other attributes of the wireless coverage area.

II. Use of Wireless Coverage Data

As mentioned above, the wireless coverage data that indicate the geographic range of availability of wireless navigation-related services or data are provided to end users. The wireless coverage data is used by end users to indicate where (geographically) navigation-related services or data are available wirelessly.

A. The End Users' Computing Platforms

Figure 8:
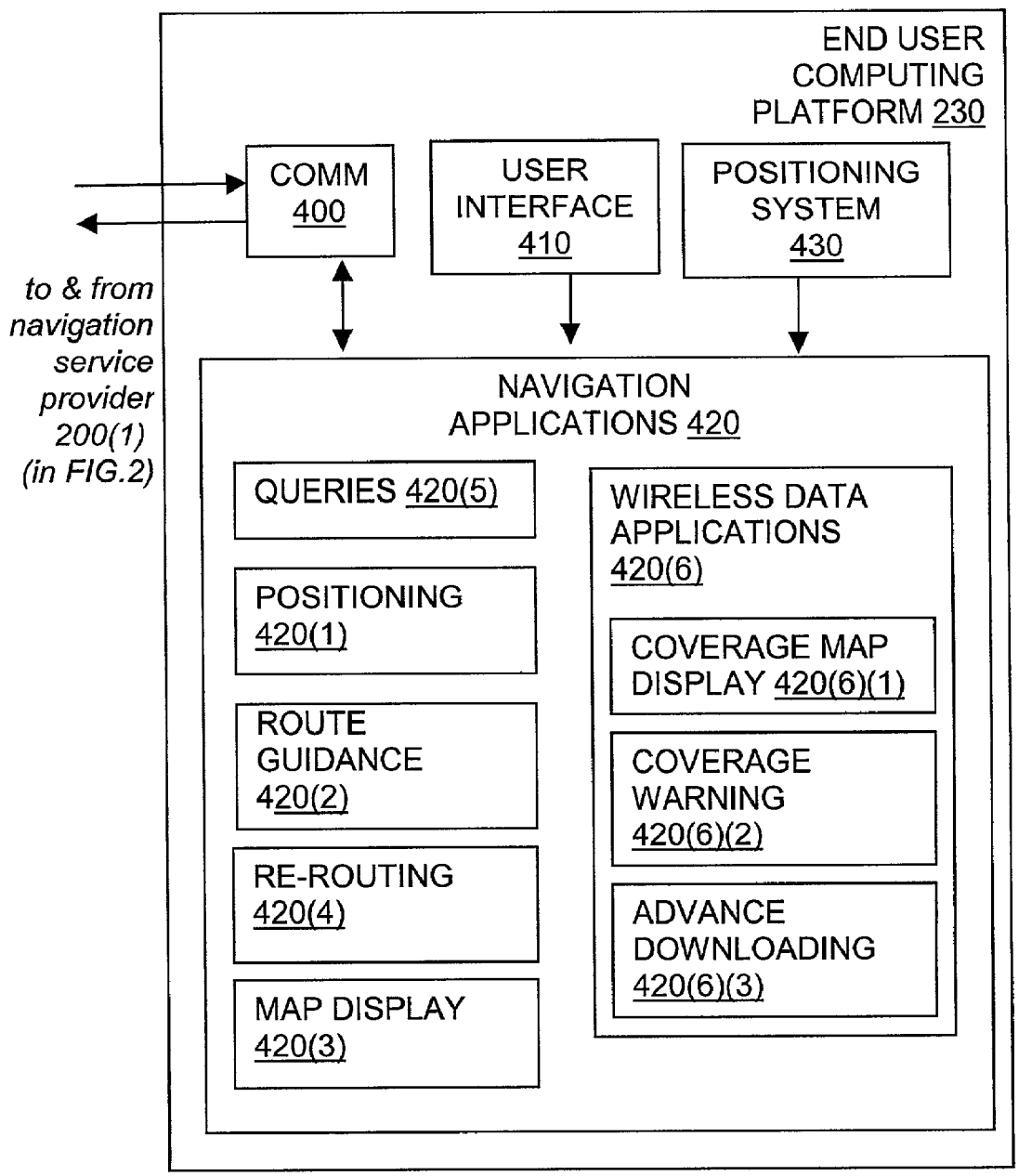
FIG. 8 is a block diagram showing components of one of the end user's computing platforms shown in FIG. 2.

As mentioned above, each end user uses a computing platform (230 in FIG. 2) to obtain data or navigation-related or map-related services from the navigation services provider 200(1). FIG. 8 is a block diagram that shows components included in one of the end user's computing platforms 230. As mentioned above, end users may use different kinds of computing platforms to access the navigation services provider 220(1). Different end user computing platforms may have different hardware and software and the navigation-related functions that are performed on the end users' computing platforms may vary from one end user platform to another. Accordingly, FIG. 8 shows an example of one configuration of an end user computing platform. It is understood that not all end user computing platforms may necessarily provide all the functions described in connection with the embodiment in FIG. 8 and that some end user computing platforms may provide additional or other functions.

Although the different end user computing platforms may have different hardware and software resources, all the end user computing platforms receive data from the navigation services provider (200(1) in FIG. 2). The end user's computing platform 230 includes a communications system 400. The communications system 400 in the end user's computing platform 230 includes the hardware and software components needed to receive messages from and send messages to the navigation services provider (200(1) in FIG. 2) over the data network 250. The communications system 400 interfaces with other components in the end user's computing platform 230.

The end user's computing platform 230 also includes a user interface 410. The user interface 410 allows the end user to provide input to and receive information from the end user's computing platform 230. The user interface 410 includes hardware and software components. For example, the user interface 410 may include a display, a microphone, speakers, a keypad, or other kinds of means for inputting information into the computing platform and outputting information therefrom. The user interface 410 includes supporting software that may provide menus, prompts, audio, etc. The user interface 410 interfaces with other components in the end user's computing platform 230.

Included on the end user's computing platform 230 are navigation-related applications 420. The navigation-related applications 420 use the data obtained from the navigation services provider 200(1). One of the navigation-related applications 420 is a positioning application 420(1). The positioning application 420(1) uses geographic data obtained from the navigation services provider 200(1) to determine the position of the end user's computing platform 230 relative to data representing the road network. The positioning application 420(1) may also obtain data from a positioning system 430 which is part of the end user's computing platform 230. The positioning system 430 may use GPS, dead-reckoning, or a combination of these or other technologies to determine the location of the end user's computing platform 230. Methods for performing positioning are disclosed in U.S. Pat. No. 6,192,312, the entire disclosure of which is incorporated herein by reference. The positioning system 430 may also use technologies that determine cell phone positions (or other wireless phone positions) in a geographic area. These technologies may employ triangulation, time-of-arrival, or other techniques implemented with equipment located away from a cell phone to determine the location of the cell phone in a geographic area. The positioning application 420(1) and the positioning system 430 are optional, i.e., not all end users' computing platforms may provide for or support positioning.

Another of the navigation applications 420 on the end user's computing platform is route guidance 420(2). The route guidance application 420(2) uses data from the navigation services provider 200(1) to provide instructions for the end user to travel to a desired destination. Methods for performing route guidance using geographic data are disclosed in U.S. Pat. No. 6,199,013, the entire disclosure of which is incorporated herein by reference.

Another of the navigation applications 420 on the end user's computing platform is map display 420(3). The map display 420(3) uses data from the navigation services provider 200(1) to provide maps graphically on the display screen of the user interface 410 of the end user's computing platform. The maps may show the area around the location of the end user's computing platform, the area along a route that the end user is following, the area around a location specified by the end user, or any other specified area. Methods for performing map display using geographic data are disclosed in U.S. Pat. Nos. 6,092,076 and 6,163,749, the entire disclosures of which are incorporated herein by reference.

B. Using Wireless Coverage Data on an End User'S Computing Platform

As mentioned above, the wireless coverage data can be used to indicate to end users where (geographically), navigation-related services or data are available wirelessly (and likewise where navigation-related services or data are not available wirelessly). In one embodiment, end users' computing platforms 230 request wireless coverage data from the navigation services provider 200(1). An end user's computing platform 230 makes this request while it is located within one of the areas in which navigation-related or map-related data are available wirelessly.

(1) Displaying Wireless Coverage Areas

In one embodiment, when the end user's computing platform receives the wireless coverage data, it uses the wireless coverage data to show a coverage map on the display screen of the end user's computing. The coverage map may be generated by a coverage map generation application 420(6)(1). The coverage map generation application 420(6)(1) may be included on the end user's computing platform. The coverage map generation application 420(6)(1) may be part of the map display program installed on the end user's computing platform. Alternatively, the coverage map generation application 420(6)(1) may be a separate program. According to still another alternative, the coverage map generation application 420(6)(1) may be downloaded as an applet or a plug-in from the navigation services provider 200(1) along with the wireless coverage data.

Figure 9:
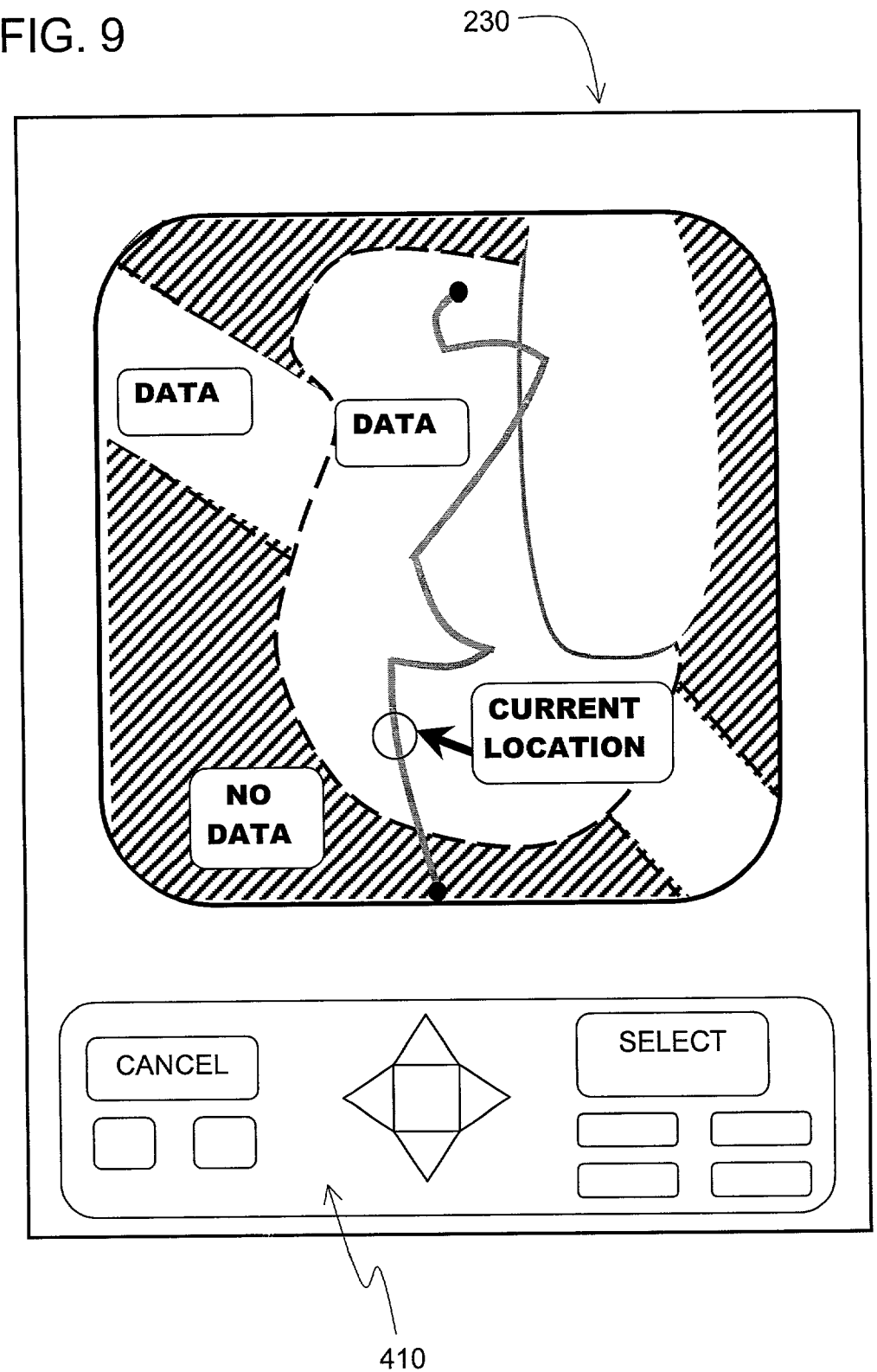
FIG. 9 is an illustration of the end user's computing platform of FIG. 8 showing a map image on the display screen relating to a wireless coverage.

The coverage map rendered on the display screen of the end user's computing platform indicates the areas in which navigation-related or map-related data are available wirelessly and also indicates areas in which navigation-related or map-related data are not available wirelessly. In a preferred embodiment, the coverage map also shows the current position of the end user's computing platform. FIG. 9 shows an example of this feature. FIG. 9 shows the display screen of the user interface 410 of the end user's computing platform 230. On the display screen is a map showing areas in which navigation-related services or data are available wirelessly and areas in which navigation-related services or data are not available wirelessly. In the embodiment shown in FIG. 9, the areas in which navigation-related services or data are not available wirelessly are shown as hatched. (Instead, of showing these areas as hatched, the areas in which navigation-related services or data are not available wirelessly may be shown in a different color, by shading, by boundaries, etc.) In addition, according to this embodiment, the current location of the end user is indicated on the coverage map. The current location of the end user can be determined using the positioning application (420(1) in FIG. 8) or by any other means.

According to one alternative feature, a message is overlaid on the display screen. The message indicates to the end user the areas in which navigation-related services or data are available wirelessly. Alternatively, a message may be shown in the display screen that indicates to the end user the areas in which navigation-related services or data are not available wirelessly. Both these features are shown in FIG. 9 by means of the boxes containing the words "DATA" and "NO DATA."

(2) Warning About Leaving or Entering a Wireless Coverage Area

Figure 10:
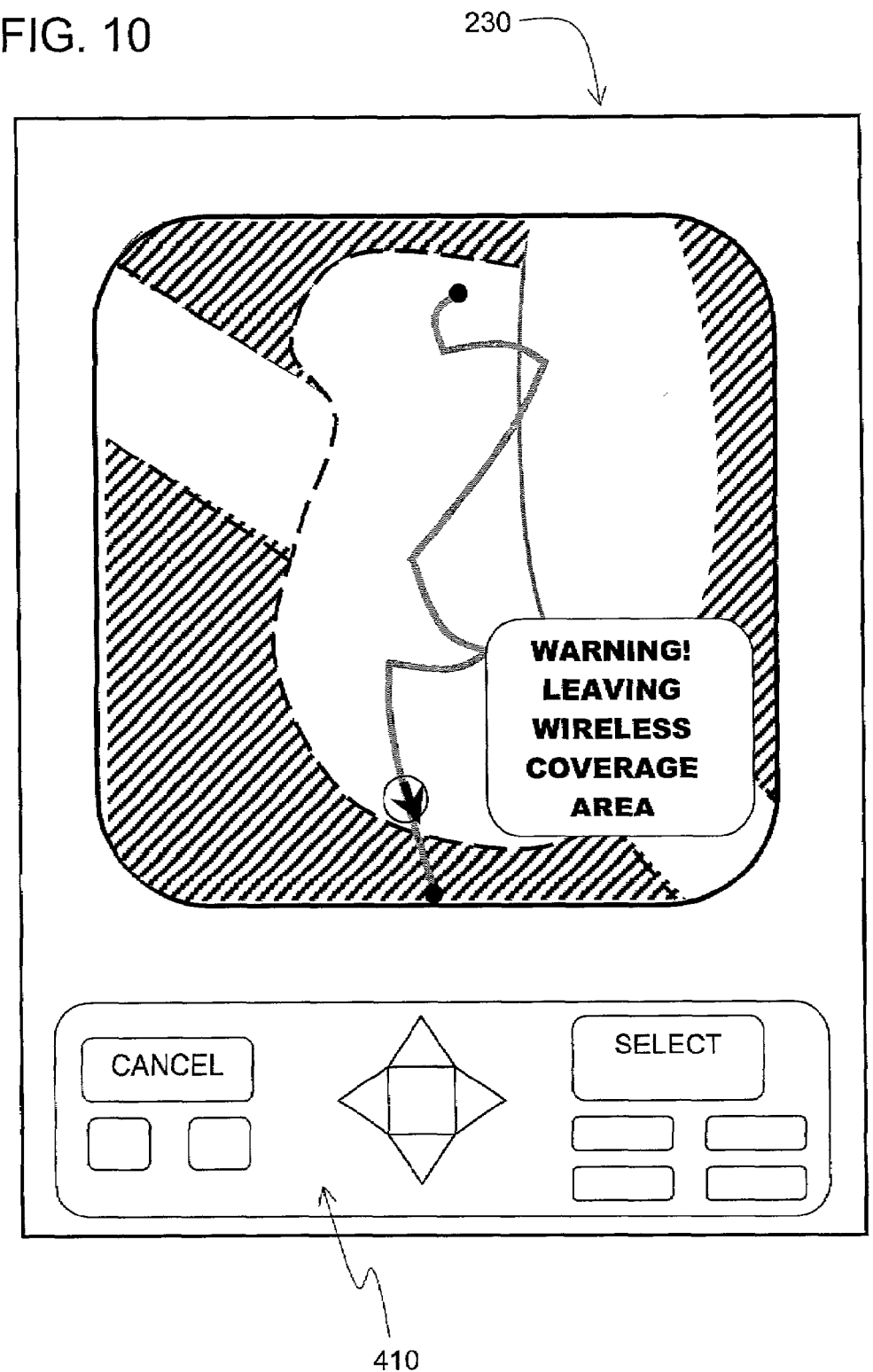
FIG. 10 is an illustration of the end user's computing platform of FIG. 8 including a visual warning message about the availability of wireless coverage.

According to another alternative embodiment, the wireless coverage data can be used on the end user's computing platform to provide the end user with a warning that the end user is about to leave an area in which navigation-related services or data are available wirelessly. This warning can be generated by a wireless coverage warning application 420(6)(2) in the end user's computing platform. The warning may be provided visually on the display screen of the user interface of the end user's computing platform. Alternatively, the warning can be provided audibly using a speaker of the user interface of the end user's computing platform. Both visual and audio warnings may be provided. The warning may be provided in combination with the display of a coverage map, as explained above. FIGS. 10 and 11 show examples of these warning features.

According to an another alternative embodiment, a message can be provided when the end user enters a wireless coverage area. The message may be similar to the warnings provided when leaving a wireless coverage area.

(3) Obtaining Data for Uncovered Areas

An advantage of this embodiment is that the end user can make additional requests for data about areas outside a wireless coverage area while still within the wireless coverage area. For example, the user may request navigation-related services or data for areas outside the wireless coverage area. These data for areas outside the wireless coverage area are then saved on the end user's computing platform so that they can be used when the end user travels outside the wireless coverage area. These data can be used to generate map displays, provide routing guidance, and so on. The end user can also request data for a route that extends through an uncovered area.

According to another alternative, a wireless data downloading application (420(6)(3) in FIG. 8) on the end user's computing platform automatically requests and obtains data for uncovered areas whenever the end user approaches an uncovered area. The wireless data downloading application 420(6)(3) on the end user's computing platform may download all the data for an uncovered area being approached. Alternatively, if the user is traveling along a route to a destination that is located in, or passes through, an uncovered area, the wireless data downloading application 420(6)(3) on the end user's computing platform automatically downloads sufficient data for the uncovered areas through which the end user is expected to travel.

III. Other Alternatives

In the embodiments described above, it was stated that the end user's computing platform obtained the wireless coverage data from the navigation services provider. In an alternative embodiment, the wireless coverage data may be stored on media located with the end user. For example, in one alternative, the wireless coverage data may be stored on a CD-ROM or DVD installed with the end user's computing platform.

In the embodiments described above, it was stated that end user's computing platforms communicated with the navigation services provider to obtain navigation-related services or data. According to alternative embodiments, an end user's computing platform may provide navigation-related services using a geographic database installed locally with the end user's computing platform. According to this alternative a geographic database installed locally with the end user's computing platform is used for certain types of navigation-related functions, such as route guidance, map display, or route guidance. The end user's computing platform communicates with the navigation services provider for certain functions, such as real-time traffic, updates, and weather. With this type of system, the end user can be provided with warnings about leaving or entering wireless coverage areas. When the end user leaves a wireless coverage area, the features provided by the navigation services provider, such as real-time traffic and updates, are not available. However, the features that can be provided using only the locally installed geographic database are still available.

According to another alternative, when the end user leaves a wireless coverage area, features that rely on the availability of data wirelessly, such as real-time traffic and updates, are still provided using data that have been downloaded prior to leaving the wireless coverage area. In this alternative, the data that have been downloaded while in a wireless coverage area can be used for a period of time until they become obsolete. For example, in the case of traffic data, an end user who has left a wireless coverage area may be able to use traffic data that have been downloaded from a navigation services provider prior to leaving the wireless coverage area until the traffic data becomes obsolete, e.g., an hour.

According to another alternative, when an end user is following a route that leaves a wireless coverage area, traffic related data and updates for the roads in and along the route are downloaded to the end user's computing platform prior to leaving the wireless coverage area.

In some of the embodiments described above, it was stated that wireless coverage data are associated with a geographic database to indicate areas in which navigation-related services or data are available wirelessly. In an alternative, the wireless coverage data can indicate areas in which navigation-related services or data are not available wirelessly.

In the embodiments described above, end user computing platforms were described as having certain navigation applications, such as positioning, route guidance, and map display. In alternative embodiments, some or all of these navigation applications may reside on the navigation services server. According to these alternative embodiments, end users may be able to operate these server-based navigation applications using their local computing platforms, or may be able to obtain the results from these server-based applications using their local computing platforms.

According to a further alternative embodiment, the wireless coverage data can be used to restrict selection of destinations. According to one alternative, when an end user is searching for a destination of a given type (e.g., points of interest, such as hotels, restaurants, etc.), the list of available destinations may be restricted to only those that are located within wireless coverage areas. According to this alternative, destinations of a given type that are located outside wireless coverage areas are not shown to end users as being available. According to an alternative, destinations that are located outside wireless coverage areas may be made available to some users (such as those having systems capable of downloading sufficient data for travel in the uncovered areas), but not to other users. Alternatively, destinations that are located outside wireless coverage areas may be made available to users, but with a warning that the destinations are located outside wireless coverage areas. According to yet another alternative, an end user may be able to choose whether destinations that are located outside wireless coverage areas are returned when searching. According to another alternative, an end user may be able to select a preference for destinations that are located in wireless coverage areas when searching.

According to another further alternative, the wireless coverage data can be used to restrict calculation of routes. When calculating a route to a destination, a route calculation application (located on either the navigation services server or on the end user's computing platform) may restrict the road segments available for inclusion in the route to those located in wireless coverage areas. According to an alternative, an end user may be able to choose whether any portion of a route crosses outside wireless coverage areas. According to another alternative, an end user may be able to select a preference for routes that are located in wireless coverage areas so that routes remain inside wireless coverage areas whenever possible.

It is intended that the foregoing detailed description be regarded as illustrative rather than limiting and that it is understood that the following claims including all equivalents are intended to define the scope of the invention.

I claim:

1. A method of operation for an end user's computing device that provides navigation-related services to the end user, the method comprising:
with the end user's computing device, establishing a wireless communications link with a remotely located navigation services provider; and
obtaining wireless navigation services coverage data from said remotely located navigation services provider, wherein said wireless navigation services coverage data indicate areas in which navigation-related data from the navigation services provider are unavailable wirelessly.

2. A method of operation for an end user's computing device that provides navigation-related services to the end user, the method comprising:
with the end user's computing device, establishing a wireless communications link with a remotely located navigation services provider; and
obtaining wireless navigation services coverage data from said remotely located navigation services provider, wherein said wireless navigation services coverage data indicate areas in which navigation-related data from the navigation services provider are available wirelessly.

3. The method of claim 1 or 2 further comprising:
using the wireless navigation services coverage data to indicate on a display screen of said end user's computing device areas in which navigation-related data from the navigation services provider are available wirelessly.

4. The method of claim 3 wherein said areas in which navigation-related data from the navigation services provider are unavailable wirelessly are indicated by color coding.

5. The method of claim 3 wherein said areas in which navigation-related data from the navigation services provider are unavailable wirelessly are indicated by hatching.

6. The method of claim 3 wherein said areas in which navigation-related data from the navigation services provider are unavailable wirelessly are indicated by boundaries.

7. The method of claim 1 or 2 further comprising:
using the wireless navigation services coverage data to indicate on a display screen of said end user's computing device areas in which navigation-related data from the navigation services provider are unavailable wirelessly.

8. The method of claim 1 or 2 further comprising:
using the wireless navigation services coverage data to provide a warning that the end user is leaving an area in which navigation-related services are available wirelessly.

9. The method of claim 8 wherein the warning is provided audibly.

10. The method of claim 8 wherein the warning is provided visually.

11. The method of claim 2 further comprising:
restricting selection of destinations to those located in said areas in which navigation-related data from the navigation services provider are available wirelessly.

12. The method of claim 1 or 2 further comprising:
restricting calculation of routes to limit crossing into areas in which navigation-related data from the navigation services provider are unavailable wirelessly.

13. A method of operation for a computing device that provides navigation-related services to an end user, the method comprising:
while the computing device is located in a first area in which navigation-related data are available wirelessly from a remotely located navigation services provider, establishing a wireless communications link with the remotely located navigation services provider;
obtaining wireless navigation services coverage data from said remotely located navigation services provider, wherein said wireless navigation services coverage data indicate areas in which navigation-related data from the navigation services provider are unavailable wirelessly; and
prior to leaving said first area, downloading navigation-related data for a second area located outside said first area, wherein navigation-related data are not available wirelessly from the remotely located navigation services provider in said second area.

14. The method of claim 13 further comprising:
using said data in said computing device to provide navigation-related services while said computing device is located in said second area.

15. The method of claim 13 wherein the data for the second area correspond to a destination to which the end user is traveling and which is located outside said first area.

16. The method of claim 13 wherein the data for the second area correspond to a portion of a route on which a vehicle in which the end user is located is traveling, wherein the portion of the route is located outside the first area.

17. A mobile device that provides navigation-related services to an end user, comprising:
a memory for storing geographic data to provide navigation services and for storing wireless coverage data to identify a wireless coverage area; and
a processor operatively coupled to the memory to wirelessly download wireless navigation services coverage data and geographic data and store the wireless navigation services coverage data and geographic data in the memory, wherein, when the end user uses the geographic data to travel to a destination, before the end user is expected to travel beyond the wireless coverage area, the processor wirelessly downloads sufficient geographic data for the uncovered wireless coverage areas through which the end user is expected to travel.

18. A mobile device according to claim 17, wherein the processor automatically downloads sufficient data for the uncovered areas through which the end user is expected to travel.

19. A mobile device according to claim 17, wherein after the processor downloads sufficient data for the uncovered areas through which the end user is expected to travel, the processor provides real-time features still that rely on the availability of data wirelessly using data that have been downloaded prior to leaving the wireless coverage area.

20. A mobile device according to claim 19, the processor provides the real-time features for a period of time until they become obsolete.

21. A method of wireless end user navigation, comprising the steps of:
traveling to a destination;
obtaining wireless navigation services coverage data from a remotely located navigation services provider, wherein said wireless navigation services coverage data indicate areas in which navigation-related data from the navigation services provider are unavailable wirelessly; and before an end user traveling to a destination is expected to travel beyond a wireless coverage area, wirelessly downloading and storing sufficient navigation-related geographic data for uncovered wireless coverage areas through which the end user is expected to travel.

22. A method of wireless end user navigation according to claim 21, wherein the step of wirelessly downloading and storing automatically downloads sufficient data for the uncovered areas through which the end user is expected to travel.

23. A method of wireless end user navigation according to claim 21, wherein the step of wirelessly downloading and storing geographic data for the uncovered wireless coverage areas downloads real-time features.

24. A method of wireless end user navigation according to claim 23, further comprising the step of relying on the downloaded real-time features for a period of time until they become obsolete.

25. A method of wireless end user navigation according to claim 21, further comprising the step of wirelessly downloading road segment data.

26. A method of wireless end user navigation according to claim 25, wherein the road segment data represents road segments beyond the available wireless coverage area.

27. A method of wireless end user navigation according to claim 25, wherein the road segment data includes information describing features of the represented road segments selected from the group consisting of: (1) segment data indicating restrictions, if any, on the direction of vehicular travel permitted on the represented road segment, (2) segment data that indicates a speed limit or speed category, (3) segment data indicating whether the represented road segment is part of a controlled access road, a ramp to a controlled access road, a bridge, a tunnel, a toll road, a ferry, (4) segment data having geographic coordinates of a represented road segment and (5) segment data indicating a postal zone or administrative zone in which the road segment is located.

28. A method of wireless end user navigation according to claim 21, further comprising the step of wirelessly downloading data that represent types of geographic features.

29. A method of wireless end user navigation according to claim 21, further comprising the step of wirelessly downloading data that represents an arbitrary boundary.

30. A method of wireless end user navigation according to claim 21, further comprising the step of wirelessly downloading data that represents postal zones.

31. A method of wireless end user navigation according to claim 21, further comprising the step of wirelessly downloading data that represents administrative zones.

32. A method of wireless end user navigation according to claim 31, wherein the administrative zones are selected from the group consisting of countries, states, cities, counties, townships, and provinces.

33. The method of claim 13, wherein the step of downloading navigation-related data from said remotely located navigation services provider obtains road segment data.

34. The method of claim 33, wherein the road segment data represents road segments for the second area.

35. The method of claim 34, wherein the road segment data includes information describing features of the represented road segments selected from the group consisting of: (1) segment data indicating restrictions, if any, on the direction of vehicular travel permitted on the represented road segment, (2) segment data that indicates a speed limit or speed category, (3) segment data indicating whether the represented road segment is part of a controlled access road, a ramp to a controlled access road, a bridge, a tunnel, a toll road, a ferry, (4) segment data having geographic coordinates of a represented road segment and (5) segment data indicating a postal zone or administrative zone in which the road segment is located.

36. The method of claim 13, wherein the step of downloading navigation-related data from said remotely located navigation services provider obtains data that represent types of geographic features.

37. The method of claim 13, wherein the step of downloading navigation-related data from said remotely located navigation services provider obtains data that represents an arbitrary boundary.

38. The method of claim 13, wherein the step of downloading navigation-related data from said remotely located navigation services provider obtains data that represents postal zones.

39. The method of claim 13, wherein the step of downloading navigation-related data from said remotely located navigation services provider obtains data that represents administrative zones.

* * * * *